United States Patent [19]
Tsujioka et al.

[11] Patent Number: 5,518,078
[45] Date of Patent: May 21, 1996

[54] COORDINATES INPUT DEVICE

[75] Inventors: Hiroshi Tsujioka; Katsuhiko Hashimoto; Naoki Shiraishi, all of Nara, Japan

[73] Assignee: Sharp Kabushiki Kaisha, Osaka, Japan

[21] Appl. No.: 972,908

[22] Filed: Nov. 6, 1992

[30] Foreign Application Priority Data

Nov. 8, 1991 [JP] Japan .................. 3-292997
Nov. 28, 1991 [JP] Japan .................. 3-314888

[51] Int. Cl.$^6$ ................................. G08C 21/00
[52] U.S. Cl. ............................................ 178/18
[58] Field of Search ................... 178/18, 19, 20; 345/173, 174; 348/709.11; 382/13

[56] References Cited

U.S. PATENT DOCUMENTS

| | | | |
|---|---|---|---|
| 4,306,110 | 12/1981 | Nelson et al. . | |
| 4,581,483 | 4/1986 | Ralston | 178/18 |
| 4,698,460 | 10/1987 | Krein et al. . | |
| 4,929,934 | 5/1990 | Ueda et al. | 178/19 |
| 4,992,630 | 2/1991 | Mlezko | 178/18 |
| 5,008,497 | 4/1991 | Asher | 178/18 |
| 5,010,213 | 4/1991 | Moriwaki et al. | 178/18 |
| 5,062,198 | 11/1991 | Sun . | |
| 5,181,030 | 1/1993 | Itaya et al. | 178/18 |
| 5,231,381 | 7/1993 | Duwaer | 178/19 |

FOREIGN PATENT DOCUMENTS

| | | |
|---|---|---|
| 59-94184 | 5/1984 | Japan . |
| 59-119630 | 7/1984 | Japan . |
| 60-154418 | 8/1985 | Japan . |
| 337708 | 2/1991 | Japan . |

*Primary Examiner*—Stephen Chin
*Assistant Examiner*—Kevin Kim

[57] ABSTRACT

In a panel member of a coordinates input device, a first input unit and a second input unit are set on a pair of transparent electrodes and the first input unit only allows input by a member of a relatively large pressing pressure such as by using a pen. The second input unit also allows input by pressing with a member of a relatively small pressing pressure, such as a finger, and thus is not limited to a pen. In order to achieve a coordinates input device of enhanced accuracy in the reading of pressing position by accurately measuring the pressing level at the pressing position, the device possesses a structure in which an X-direction resistive film and a Y-direction resistive film are separated by a tiny clearance and, when the pressing position is pressed, various switches are controlled by a specified procedure such that the X-direction and Y-direction levels of the contact resistance due to the pressing of the position are detected and, only when the pressing levels are sufficient, are coordinates of the pressing position measured.

10 Claims, 13 Drawing Sheets

A : PRESSING POSITION

V : VOLTAGE SOURCE $R_{X1}, R_{X2}$ : X-DIRECTION DIVISION RESISTANCES $R_{Y1}, R_{Y2}$ : Y-DIRECTION DIVISION RESISTANCES $R_P$ : CONTACT RESISTANCE $R_{LX}$ : RESISTANCE FOR PRESSING MEASUREMENT $R_{ADX}, R_{ADY}$ : INPUT RESISTANCES OF A/D CONVERTER $SW_{XH}, SW_{XL}, SW_{YH}, SW_{XP}, SW_{YL}$ : SWITCHES $V_X, V_Y$ : MEASURED VOLTAGES $V_X, V_Y$ : MEASURED VOLTAGES $R_{ADX}, R_{ADY}$ : INPUT RESISTANCES OF A/D CONVERTER $R_P$ : CONTACT RESISTANCE $R_{Y1}, R_{Y2}$ : Y-DIRECTION DIVISION RESISTANCES $R_{X1}, R_{X2}$ : X-DIRECTION DIVISION RESISTANCES $R_{LX}, R_{LY}$ : RESISTANCE FOR MEASURING PRESSING

V : POWER SOURCE

A : PRESSING POSITION $SW_{XH}, SW_{YP}, SW_{YH}, SW_{XL}, SW_{XP}, SW_{YL}$ : SWITCHES (a)

(b)

V : POWER SOURCE $V_X, V_Y$ : MEASURED VOLTAGES $R_{X1}, R_{X2}$ : X-DIRECTION DIVISION RESISTANCES $R_{Y1}, R_{Y2}$ : Y-DIRECTION DIVISION RESISTANCES $R_P$ : CONTACT RESISTANCE

A : PRESSING POSITION $R_{AD}$ : INPUT RESISTANCE OF A/D CONVERTER (a)

(b)

V : POWER SOURCE
A : PRESSING POSITION
$R_P$ : CONTACT RESISTANCE
$R_{X1}, R_{X2}$ : X-DIRECTION DIVISION RESISTANCES
$R_{Y1}, R_{Y2}$ : Y-DIRECTION DIVISION RESISTANCES
$R_{AD}$ : INPUT RESISTANCE OF A/D CONVERTER
$R_L$ : RESISTANCE FOR PRESSING MEASUREMENT
$V_{PX}, V_{PY}$ : PRESSING MEASURED VOLTAGES

COORDINATES INPUT DEVICE

BACKGROUND OF THE INVENTION

1. Field of the Invention

The present invention relates to a coordinates input device generally known as a touch panel, and more particularly to a coordinates input device for reading by converting a pressing position signal into an electric signal when the a surface having a planar resistive thin film thereon is pressed.

2. Description of the Related Art

An input device known as a touch panel is widely used recently in combination with a liquid crystal display device or the like. The touch panel is available in an analog input type and a digital input type, as shown in FIG. 1 and FIG. 2, respectively. In the coordinates input device of an analog input type, in FIG. 1, transparent conductive films 4, 5 such as ITO are formed on the entire confronting surfaces of a pair of transparent film substrates 2, 3, and electrodes 6, 7, 8, 9 of metal or other such conductors are formed at both ends in mutually orthogonal directions on the transparent conductive films 4, 5. The electrodes 6 to 9 are respectively connected to supply voltages V1 to V4 through switches S1 to S4. Such film substrates 2, 3 are mutually glued and fixed on a display device 10 such as a liquid crystal display device, and a coordinates input device 1 is thus composed.

In this coordinates input device 1, first of all, the switches S1, S2 are made to conduct, while the switches S3, S4 are cut off. As a result, a voltage (V1–V2) is applied between the electrodes 6, 7. When a pressing position P of the film substrate 2 is pressed in this state, an interior division voltage of the inter-electrode voltage (V1–V2) at the pressing position P by the resistance value of the transparent conductive film 4 is applied to the transparent conductive film 5, thereby turning on the switches S3, S4, and this voltage is read from the electrodes 8, 9. Consequently, the X-direction coordinate of the pressing position P is detected. As for the Y-direction coordinate of the pressing position P, to the contrary, by turning on the switches S3, S4, a voltage (V3–V4) is applied between the electrodes 8, 9, and the interior division voltage of the transparent conductive film 5 on the pressing position P is read from the electrodes 6, 7.

On the other hand, in the coordinates input device of the digital input type in FIG. 2, a pair of film substrates 2, 3 are prepared, and band-shaped transparent electrodes 12 extending in the X-direction are arranged in plural rows in the Y-direction on the film substrate 2. The transparent electrodes 12 are individually connected to plural connection terminals 13 disposed at the end of the film substrate 2. On the other film substrate 3, transparent electrodes 14 extending in the Y-direction are disposed in plural rows in the X-direction, and the transparent electrodes 14 are individually connected to plural connection terminals 15 disposed at the end of the film substrate 3. By joining together the film substrates 2, 3, the crossing parts of the transparent electrodes 12, 14 are arranged in a matrix, and they are fixed on the display device 10. Here, when the pressing position P is pressed, the transparent electrodes 12, 14 are scanned in time division by a control device such as a microcomputer to which the connection terminals 13, 15 are connected, and the transparent electrodes 12, 14 corresponding to the pressing position P are detected, and the X-coordinate and Y-coordinate in the unit of the transparent electrodes 12, 14 at the pressing position P are detected.

In the coordinates input device 1, an input is made by pressing the film substrate 2 with a tapered pen member. At this time, the hand holding the pen member is often used on the film substrate 2 and, in order to avoid entry of wrong input by the pressing member from a low pressing pressure (e.g., by a hand), a granular spacer made of electric insulating resin material or the like is disposed between the film substrates 2, 3 at a specific height and at a relatively high density. In such a coordinates input device 1, it is impossible to enter data by using the human finger or the like, as the pressing member thus the utility is low.

In contrast, in the coordinates input device 11 shown in FIG. 2, although a digital coordinates input is possible by using the transparent electrodes 12, 14 extending in mutually orthogonal directions, an analog input of a continuum of coordinates as in FIG. 1 is impossible, and thus the utility is low.

FIG. 16 is a block diagram of an input and output device as applied in the prior art and in an embodiment of the invention.

In FIG. 16, the input and output device comprises a CPU (central processing unit) 71 for managing and controlling the device centrally, ROM 72 and RAM 73 for storing a program and data, a clock 74, an I/O (input/output) unit 75 including a printer and CRT (cathode-ray tube) connected to the device, a keyboard 76 for entering data to the device from outside, a display unit 77 including a display such as a liquid crystal display, a display drive circuit 78 for driving the display unit 77 controlled by the CPU 71, an A/D converter (analog/digital converter) 79, a tablet unit 80, and a tablet controller 81 for driving and controlling the tablet unit 80 controlled by the CPU 71.

FIG. 17 shows the construction of the tablet unit 80 given in FIG. 16. The tablet unit 80 is composed by combining an X-direction resistive film 80a which is a resistive thin film having electrodes disposed at both ends in the horizontal direction in the drawing (that is, the X-direction), and a Y-direction resistive film 80b which is a resistive thin film having electrodes disposed at both ends in the vertical direction in the drawing (that is, the Y-direction), through a uniform tiny clearance. In the X-direction resistive film 80a, when a voltage is applied from the tablet controller 81, electricity flows from the X-HIGH side electrode to the X-LOW side electrode. In the Y-direction resistive film 80b, when a voltage is applied from the tablet controller 81, electricity flows from the Y-HIGH side electrode to the X-LOW side electrode.

In this operation, the user presses a desired position on the surface of the tablet unit 80 by using the tip of pen, pencil or the like so as to make the resistive films 80a and 80b contact each other at the contact pressing position. This contact pressing force is detected as an electric signal, and when this signal reaches a specific level, voltage division values on the resistive films 80a and 80b, (which are proportional to, the pressing position) are detected as voltage signals. These voltage signals are individually led out by the X-direction resistive film 80a and Y-direction resistive film 80b, and are input to the CPU 71 through the A/D converter 79. The CPU 71 drives the display drive circuit 78 depending on the digital input values, and the circuit 78 displays and drives the corresponding XY coordinate liquid crystal picture element on the display unit 77. In this way, when the user presses a desired position on the tablet unit 80, the picture element of the display unit 77 corresponding to the pressing position is displayed and driven.

The conventional opera%ion for input of coordinates by the input and output device shown in FIG. 16 is explained below by reference to FIG. 3, according to the processing flow in FIG. 4.

The CPU 71 repeatedly executes the processing flow for measurement of coordinates shown in FIG. 4, according to the periodic interruption of a built-in timer.

The CPU 71 applies a voltage for measurement of the X-direction pressing, in the processing of step S100 in FIG. 4 (abbreviated as S100 in the diagram). In other words, the CPU 71 sets switches $SW_{XH}$, $SW_{XP}$ shown in FIG. 3 in ON state through the tablet controller 81, and sets all other switches in OFF state. As a result, supply of voltage from a voltage source V through switch $SW_{XH}$ is started. The CPU 71 waits for a specific time until the supply voltage is stabilized, and then measures the pressing in the X-direction in the processing of next step S101.

Suppose the pressing position is a reference A in FIG. 3. At this time, the measured voltage $V_X$ is $$V_X = V \cdot R_{LX}/(R_{X1} + R_P + R_{Y2} + R_{LX}) \tag{1}$$

The input resistance $R_{ADX}$ of the A/D converter is sufficiently large so as to not affect the measurement. Here, in where $R_P$ is the case of $R_{X1}$, $R_{Y2} \ll R_P$ (the contact resistance, which varies inversely with the pressing level), the measured voltage $V_X$ indicates the pressing level regardless of the pressing position.

In the processing steps S101 and S102, since the pressing level is proportional to the measured voltage $V_X$, whether the pressing level is sufficient or not is judged on the basis of whether the voltage $V_X$ is larger than a specific value or not. At this time, if the pressing level is insufficient, measurement of coordinates is impossible, and processing ends.

When the pressing level is sufficient, processing following step S103 is executed.

In the processing at step S103, the CPU 71 applies a voltage for measurement of the X-direction coordinate. That is, the CPU 71 sets switches $SW_{XH}$ and $SW_{XL}$ shown in FIG. 3 in ON state through the tablet controller 81, and sets all other switches in OFF state. As a result, a voltage is applied in the X-direction of the resistive film 80a. The CPU 71 waits for a specific time until the applied voltage is stabilized, and then in the processing at step S104, the voltage $V_X$ is measured through the A/D converter 79. The A/D converter 79 converts the measured voltage $V_X$ into a digital signal, which is given to the CPU 71. Afterwards, the CPU 71 cancels the applied voltage to the tablet unit 80 through the tablet controller 81. That is, all switches shown in FIG. 3 are set in OFF state.

The CPU 71, in the processing at the next step S105, applies a voltage for measurement of the Y-direction coordinate. That is, the CPU 71 sets switches $SW_{YH}$ and $SW_{YL}$ shown in FIG. 3 in ON state through the tablet controller 81, and sets all other switches in OFF state. As a result, a voltage is applied to the resistive film 80b in the Y-direction from the voltage source V. The CPU 71 waits for a specific time until the applied voltage is stabilized, and in the processing at next step S106, the Y-direction coordinate is measured. The A/D converter 79 reads the measured voltage $V_Y$, converts it into a corresponding digital signal, and inputs the signal to the CPU 71 for coordinate measurement.

After the coordinate measurement, at steps S107 to S109, pressing is measured again for confirmation. Thus, an intermediate release of the pen (lowering of pressing level) is detected.

In this procedure, after the pressing level is measured in the X-direction only, the coordinates of the pressing position A in the X-direction and the Y-direction are measured, and finally, for confirmation, the level in the X-direction pressing is measured again.

To measure the coordinates on the tablet unit 80 in this way, it is important that the pressing level at the measuring point is sufficient, and that the contact of the upper and lower resistive films, that is, the X-direction resistive film 80a and Y-direction resistive film 80b be secure. The contact resistance $R_P$ shown in FIG. 3 is inversely proportional to the pressing force, and if the pressing force is insufficient, the contact resistance $R_P$ increases, and measurement of coordinates becomes inaccurate. Or, if the contact of the resistive films 80a and 80b is insufficient, it is highly possible that the upper and lower resistive films depart from each other during the measurement of coordinates. It is also known that the contact resistance $R_P$ changes steeply with respect to change of pressing level. Therefore, for measurement of coordinates at high precision, it is important to measure the pressing level with high precision and confirm that a secure contact state is obtained.

Recently, however, owing to the requirements for larger size and smaller current consumption of the tablet unit 80, the relation is not always $R_{X1}$, $RY_2 \ll R_P$, and its effect cannot be ignored. That is, as shown in formula (1) above, for the measured voltage $V_X$ to indicate the pressing level regardless of the pressing position, a pressing level sufficient for measurement of a measured voltage $V_X$ is required. In other words, if the pressing force is insufficient due to the pressed position of the measured value of the pressing level are large, and this the measurement of coordinates itself may be inaccurate.

SUMMARY OF THE INVENTION

It is hence a primary object of the invention to present a coordinates input device capable of solving the above conventional technical problems, and of entering inputs whether the pressing pressure per unit area is relatively high or relatively low, thus having enhanced utility.

It is another object of the invention to present a coordinates input device capable of enhancing the precision of reading of the pressing position by accurately measuring the pressing level at the pressing position.

To achieve the above objects, the invention presents a coordinates input device comprising:

a first input unit having transparent resistance layers formed on the entire surface of predetermined first regions of a pair of electrically insulating transparent substrates, and a pair of electrodes formed thereof at both ends thereof in mutually crossing directions of the transparent resistance layers, and a second input unit forming plural band-shaped transparent electrodes extending in mutually crossing directions, in second regions different from first regions of the transparent substrates, wherein bumps are disposed at predetermined intervals at least on one transparent substrate of the first input unit, and bumps are disposed on at least one transparent substrate of the second input unit at intervals greater than the intervals in the first input unit.

According to the invention, the first input unit and second input unit each include an electrically insulating transparent substrate. In the first input unit, when the transparent substrate is pressed to achieve contact between the transparent resistance layers of each transparent substrate and when a voltage is applied between electrodes of one transparent substrate, the interior division voltage of the voltage corresponding to the contact position is output from the electrodes of the other transparent substrate. But, with a voltage applied between electrodes of the other transparent substrate, the interior division voltage of the other transparent substrate corresponding to the pressing position is output from the electrodes of the one transparent substrate.

In the second input unit, by scanning the band-shaped transparent electrodes on each transparent substrate, the coordinates are entered as the position of the transparent electrode corresponding to the pressing position.

Here, in the first input unit, bumps are disposed at predetermined intervals, and at least on one transparent substrate in the second input unit, bumps are disposed at greater intervals than the intervals in the first input unit. Therefore, in the first input unit, an input is entered by pressing with a member relatively high in the pressing force per unit area by using a relatively thin member, while in the second input unit, an input is entered by using a member relatively low in the pressing pressure per unit area such as the human finger.

In the invention, therefore, such first input unit and second input unit are composed on a pair of transparent substrates, and as compared with the constitution of the coordinates input device composing each input unit as an independent structure, the number of production steps and the number of components may be curtailed.

In the invention, the bumps are formed approximately in a truncated cone, and the peripheral edge of the upper end contacting with the transparent resistance layer or transparent electrode formed on the confronting substrate is formed in roundly.

Also in the invention, the bumps are formed approximately, in a truncated pyramid, and the peripheral edge of the upper end contacting with the transparent resistance layer or transparent electrode formed on the confronting substrate is formed in roundly.

Also in the invention, the height of the bumps in the first input unit is selected larger than the height of the bumps in the second input unit.

The invention also presents a coordinates input device comprising:

an input panel having transparent resistance layers formed on the entire surface of mutually confronting surfaces of a pair of electric insulating transparent substrates, and a pair of electrodes formed each at both ends in the mutually crossing direction of the transparent resistance layers, means for converting an analog signal from the electrode into a digital signal according to an input threshold signal, and means for producing a threshold signal of different level to the signal converting means corresponding to the input operation state to the input panel.

In the invention, to the input panel having the same constitution as the first input unit, the signal converting means for converting the analog signal from the electrode of the input panel into a digital signal is connected. To the signal converting means is entered a threshold signal from the threshold producing means for producing a threshold signal differing in the level depending on the input operation state to the input panel, that is, whether the input is by a member relatively high in the pressing force per unit area such as a thin member, or the input is by a member relatively low in the pressing pressure per unit area such as the human finger. Therefore, when entering in a relatively high state of pressing pressure per unit area by using a thin member, a threshold signal is entered so as to convert into a digital signal in a range of relatively high level of analog signal. On the other hand, when entering with a member relatively low in the pressing pressure per unit area, a threshold signal is entered so as to convert into a digital signal in a range including a lower level range than the above level range of analog signal.

Therefore, when making an input by holding a thin member by hand, wrong input by the hand put on the panel member is prevented. Or when entering by the human finger or the like, an input can be made in the same panel member as the panel member for input by thin member, which eliminates the necessity of preparing members corresponding to input operation states, so that simplification of structure and simplification of manufacturing process may be simultaneously achieved.

In the invention, the input operation state is defined on the basis of the pressing force per unit area to the input panel, and a first input operation state of relatively large pressing force and a second input operating state of relatively small pressing force are set.

In the invention, the level of the threshold signal in the first operation state is selected higher than the level of the threshold signal in the second input state.

The coordinates input device of the invention comprises a conductive first sheet member to which a voltage is applied in a first direction on its principal plane, and a conductive second sheet member to which a voltage is applied in a second direction orthogonal to the first direction on its principal plane, being disposed so that the principal planes may confront each other across a uniform specific interval, in which the principal planes contact with each other at a pressed position, corresponding to the sufficient pressing of an arbitrary position on a plane of the opposite side of the principal plane from outside, and the corresponding pressed position is read by the combination of electric signals in the first direction and second direction, and moreover comprises first and second means for detecting, and first and second means for reading.

The first detecting means applies a voltage in the first direction, and detects the pressing level in the first sheet member as an electric signal.

The second detecting means applies a voltage in the second direction, and detects the pressing level in the second sheet member as an electric signal.

The first reading means reads the pressed position as an electric signal in the first direction, responsive to the detection signal level of the first detecting means.

The second reading means reads the pressed position as an electric signal in the second direction, responsive to the detection signal level of the second detecting means.

In the coordinates input device of the invention, being thus constituted, when an arbitrary position on the surface of the sheet member is pressed by the tip of a pen or the like, its pressing level is individually detected in the first and second directions by the first and second detecting means, and therefore as compared with the prior art of detecting in only direction only, fluctuations of the pressing level due to the pressing position on the sheet member surface may be suppressed.

Thus, according to the invention, when an arbitrary position on the surface of the sheet member is pressed by the tip of a pen or the like, its pressing level is individually detected in the first and second directions by the first and second detecting means, and therefore as compared with the prior art of detecting in only direction only, fluctuations of the pressing level due to the pressing position on the sheet member surface may be suppressed (canceled).

Because of such effects, it is possible to measure accurately whether pressed fully to the level capable of measuring the coordinates on the surface of sheet material, it is effective to improve the precision of measurement of coordinates.

Also in the invention, a voltage is applied in either one of the first and second directions, and the pressing level is detected and the pressing position is read, and successively a voltage is applied in the other direction, and the pressing level is detected and the pressing position is read.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 5:
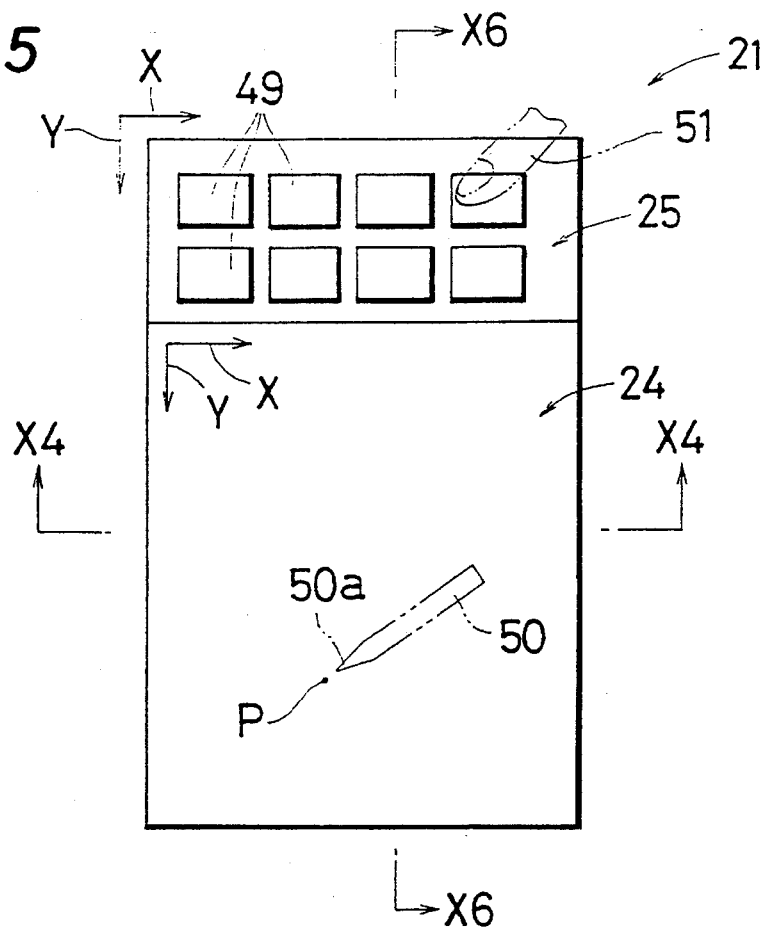
FIG. 5 is a plan view of a coordinates input device 21 in a first embodiment of the invention.
Figure 6:
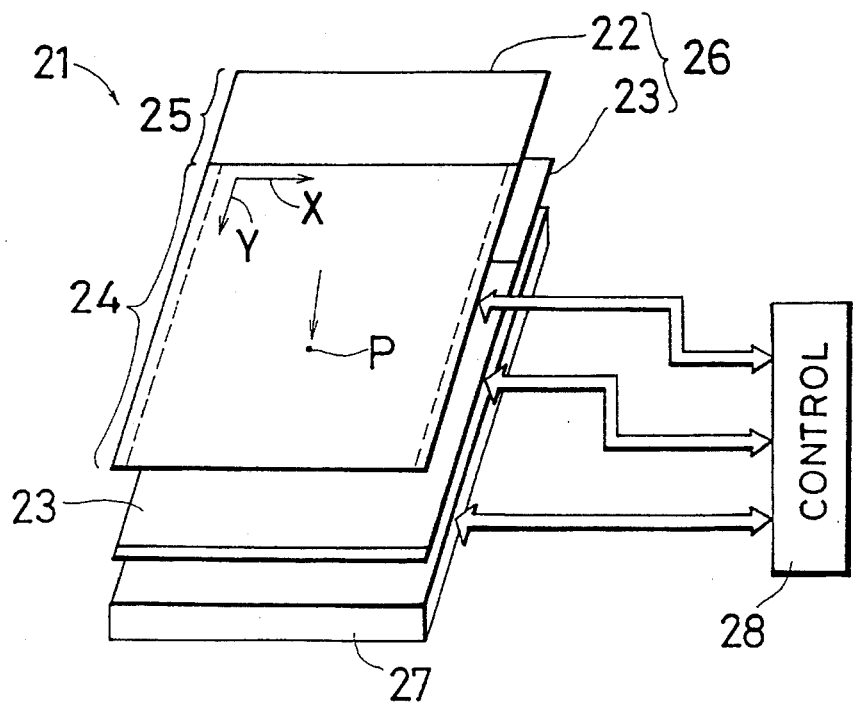
FIG. 6 is a perspective, exploded view of the coordinates input device 21.

Now referring to the drawings, preferred embodiments of the invention are described below. Referring to FIGS. 5 and 6, the coordinates input device 21 possesses, for example, a pair of transparent substrates 22, 23 made of electrically insulating synthetic resin material. On a panel member 26 including these transparent substrates 22, 23, a first input unit 24, at a lower portion of the panel member 26, and a second input unit 25, at an upper portion of the panel member 26, are disposed. The panel member 26 is attached to the surface of a display device 27 such as a liquid crystal display device, and the transparent substrates 22, 23 and the display device 27 are connected to a control device 28 realized, for example, by a microcomputer.

Figure 7:
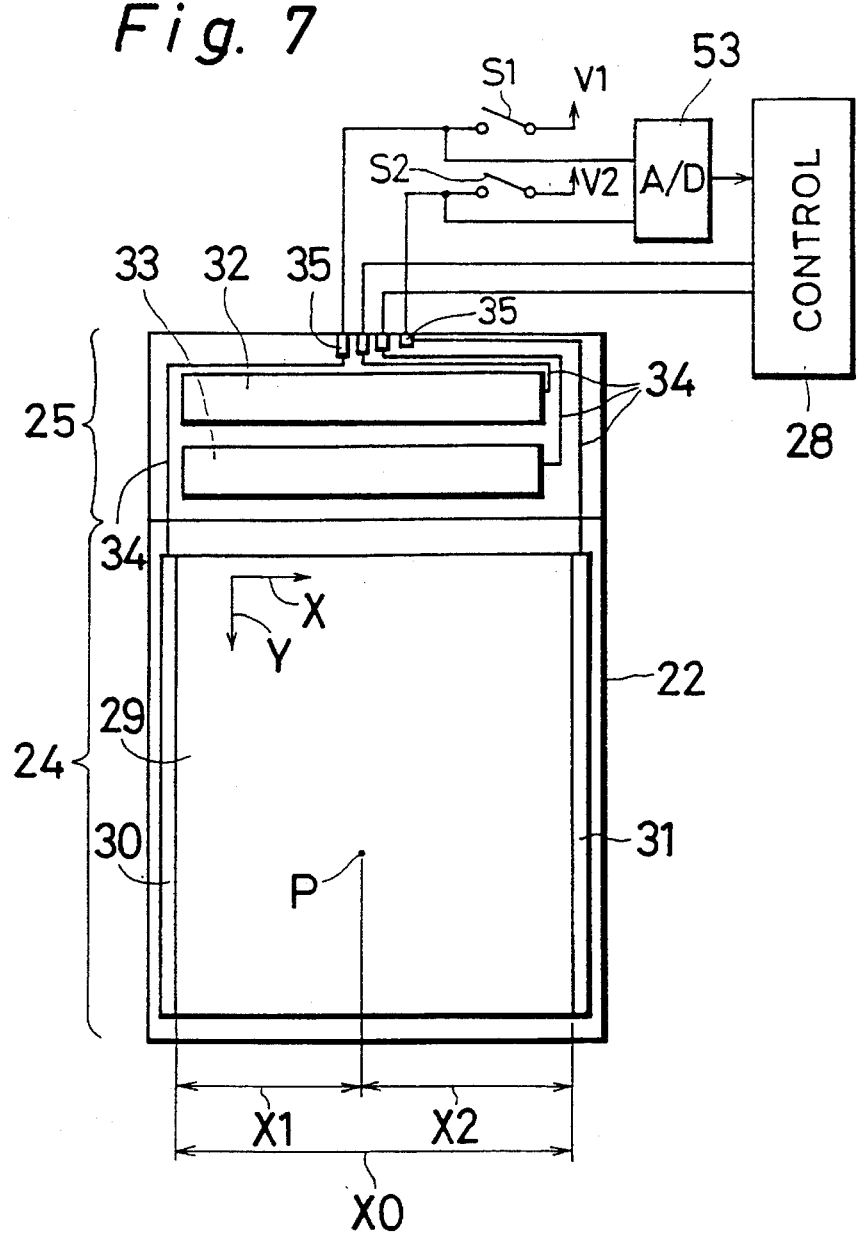
FIG. 7 is a plan view of transparent substrate 22 in device 21.
Figure 8:
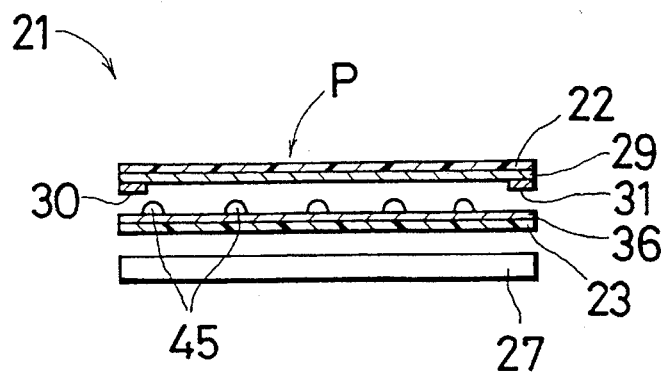
FIG. 8 is a sectional view as seen from cut section line X4—X4 in FIG. 5.

Referring to FIGS. 7–10, in the first input unit 24 on the transparent substrate 22, a transparent electrode 29 made of, for example, ITO (indium tin oxide) is formed nearly on the entire surface, and a pair of electrodes 30, 31 made of metal or other are formed at both ends in the lateral direction in FIG. 7.

In the second input unit 25 on the transparent substrate 22, transparent electrodes 32, 33 made of ITO or a similar conductor, extending in a band form in the lateral direction in FIG. 7 are disposed in the vertical direction in FIG. 7, and electrodes 30, 31, 32, 33 are individually connected to plural connection terminals 35 formed at one end of the transparent substrate 22. The connection terminals 35 corresponding to the transparent electrodes 32, 33 are connected to the control device 28, and the connection terminals 35 corresponding to the electrodes 30, 31 are connected to electrode voltages V1, V2 through switches S1, S2, respectively, and are also connected to the control device 28 through an analog/digital converter 53.

Figure 9:
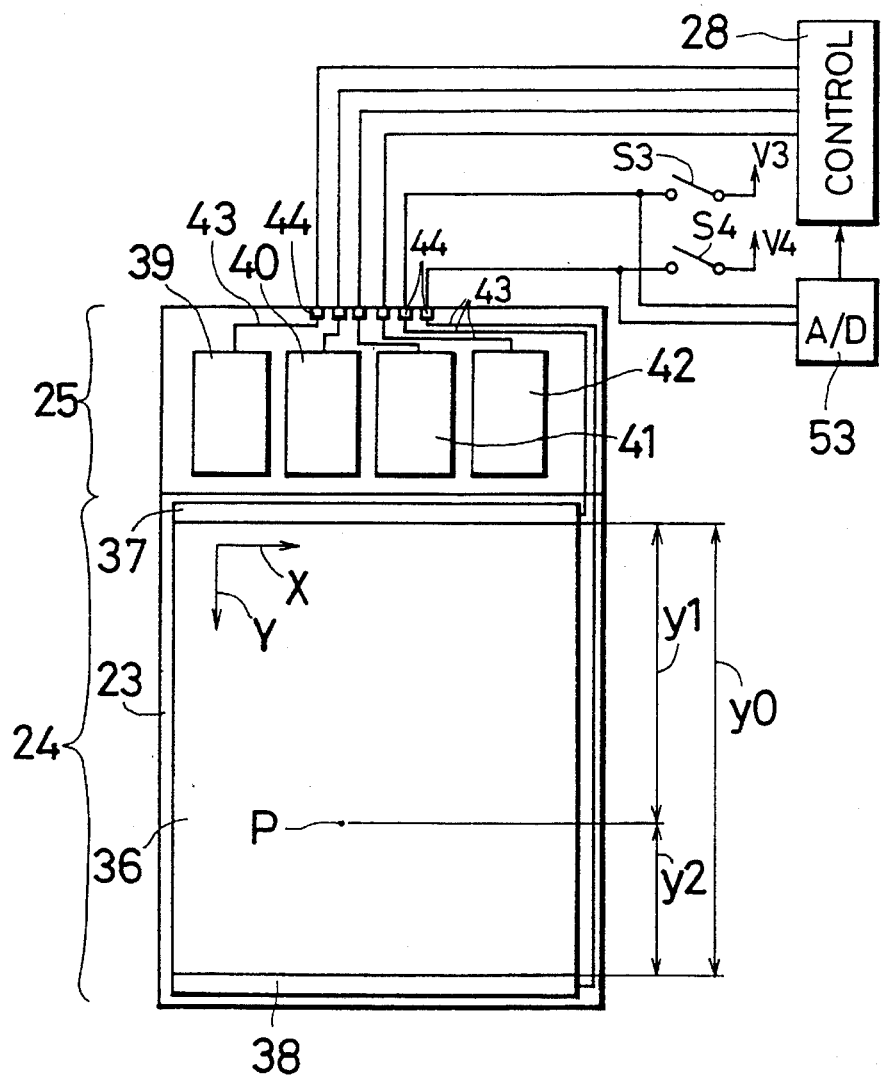
FIG. 9 is a diagram of the construction relating to a transparent substrate 23.

On the other hand, in the first input unit 24 on the transparent substrate 23, a transparent electrode 36 made of ITO or the like is formed nearly on the entire surface, and electrodes 33, 38 made of metal material or the like are formed at both ends in the vertical direction in FIG. 9 in the direction orthogonal to the lateral direction in FIG. 7 or the arranging direction of the electrodes 30, 31 in FIG. 7.

In the second input unit 25 on the transparent substrate 23, band-shaped transparent electrodes 39, 40, 41, 42 extending in the vertical direction in a range corresponding to the setting region of the transparent electrodes 32, 33 and arranged in the lateral direction in FIG. 9 are formed. The electrodes 37 to 42 are individually connected to plural connection terminals formed at one end of the transparent substrate 23 through plural circuit wirings 43 on the transparent substrate 23. The connection terminals 44 corresponding to the transparent electrodes 39 to 42 are connected to the control device 28, and the connection terminals 44 corresponding to the electrodes 37, 38 are connected to supply voltages V3, V4 through switches S3, S4 respectively, and are also connected to the control device 28 through the analog/digital converter 53.

On the first input unit 24 on the transparent substrate 23, at least on the transparent electrode 36, a spacer 45 made of an electrically insulating synthetic resin material in, for example, the shape of a circularly truncated cone, in height h1 is formed at an interval d1. The height h1 and interval d1 of the spacer 45 are selected so as not to contact with the transparent electrodes 29, 36 by the pressure of a hand, if the hand of the operator holding a pen piece 50 (FIG. 5) is put on the first input unit 24, because the input in the first input unit 24 is made by means of the pen piece 50 as mentioned later.

On the other hand, on the second input unit 25 of the transparent substrate 23, a spacer 46 of a smaller height h2 than the height h1 of the spacer 45 is disposed at a greater interval d2 than the interval d1 of the spacer 45. In this way, plural pressing members 49 are arranged in a matrix on the second input unit 25.

Figure 11:
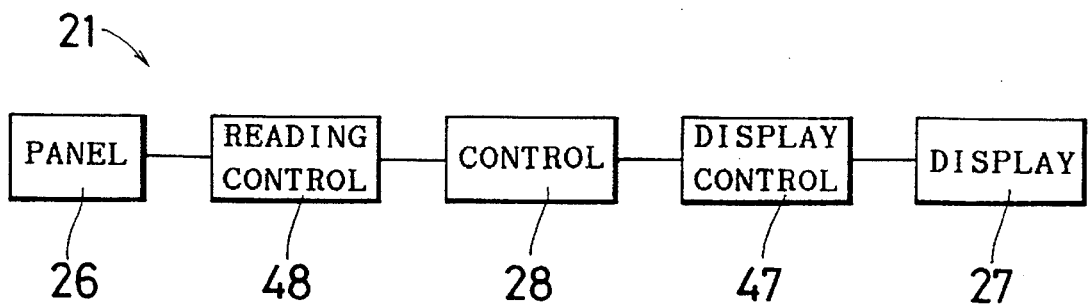
FIG. 11 is a block diagram of the coordinates input device 21.

FIG. 11 is a block diagram of the coordinates input device 21. The control device 28, when controlling the display device 27, controls at through a display control unit 47 responsible for scanning of the electrodes and the supply of signals corresponding to display data in the case of the display device 27, of, for example, a simple matrix type display device or an active matrix type display device. In the control for reading the coordinates input by input operation as mentioned below in the panel member 26, reading is controlled through a control unit 48 responsible for controlling the opening and closing of the switches S1 to S4 and the scanning of transparent electrodes 32, 33; 39 to 42.

Figure 12:
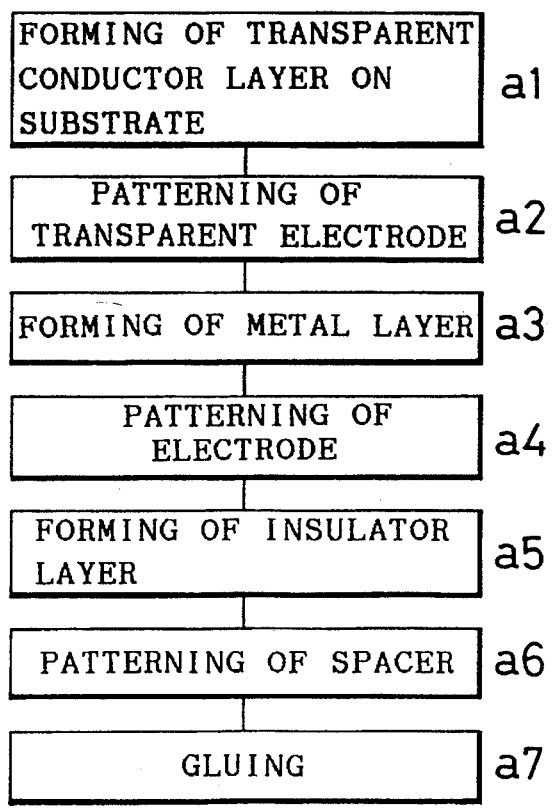
FIG. 12 is a chart for explaining the manufacturing process of panel member 26 of FIG 11.

FIG. 12 is a flow chart showing the manufacturing step of the panel member 26. At process a1, on the entire surface of the transparent electrodes 22, 23, a transparent conductor layer made of, for example, ITO is formed. At step a2, on this transparent conductor layer, the transparent electrodes 29, 36 in the first input unit and transparent electrodes 32, 33; 39 42 in the second input unit are patterned by an ordinary photo step. At process a3, a metal layer of, for example, aluminum is formed on the transparent substrates 22, 23 in this stage, and at step a4, the electrodes 30, 31; 37, 38 in the first input units circuit wirings 34, 43, and connection terminals 35, 44 are patterned on the metal layer by an ordinary photo process.

Figure 10:
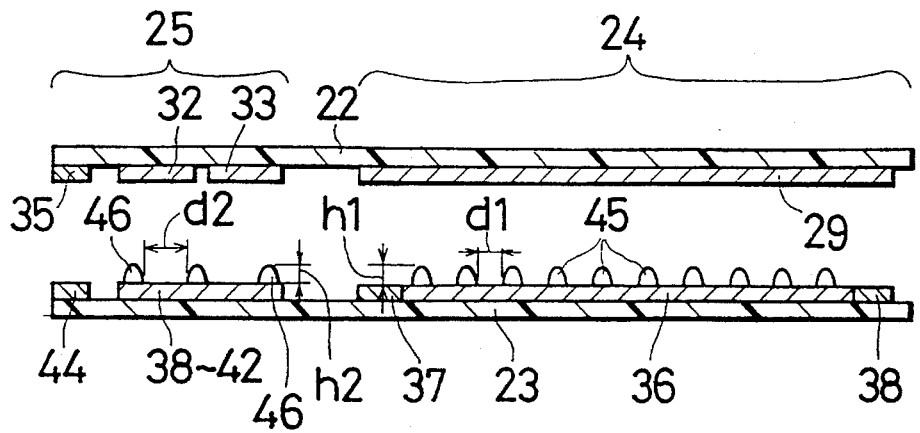
FIG. 10 is a sectional view as seen from cut section line X6—X6 in FIG. 5.

At step a5, an electric insulating synthetic resin material is formed on the transparent substrates 22, 23 by thick film technology such as screen printing. At step a6, by especially etching, spacers 45, 46 are formed by a photo process such as etching in the shape and intervals as illustrated in FIG. 10. At this time, in the first input unit 24 and second input unit 25, since the height of the spacers 45, 46 differs, insulator layers in thickness h1, h2 are printed and formed on the first input unit 24 and second input unit 25, respectively from which spacers 45, 46 in the intervals d1, d2 are formed. At step a7, the transparent substrate 22 and the transparent substrate 23 on which spacers 45, 46 are formed are glued together to compose the panel member 26.

In this embodiment, the division of the possible input pressing pressures in the first input unit 24 and second input unit 25 is defined by the height and intervals of the spacers 45, 46, and by the thicknesses of the insulator layers formed by printing on the transparent substrates 22, 23. The pattern of the mask used in the photo-etching process is selected so that the spacers 45, 46 have the intervals d1, d2, respectively.

The operation of the coordinates input device 21 in the embodiment is explained below. Input to the second input unit 25 may be made by a member having a relatively low pressing pressure, such as a human finger 51 as shown in FIG. 5, and therefore input by using a pen piece 50 is also possible. The control device 28 permits the input of a signal from either one of the transparent electrodes 32, 33, while the other electrode is set in high impedance state, by scanning alternately. In the state ready to enter signal from either one of the transparent electrodes 32, 33, the control device 28 supplies pulses to the transparent electrodes 39 to 42 (shown in FIG. 9) in a time sequence and then the transparent electrode 33 is similarly scanned. Hence, when the operator presses any one of the pressing regions 49 (FIG. 5) by the finger 51, the signal from any one of the transparent electrodes 39 to 42 corresponding to the pressing position is converted into a digital signal through one of the transparent electrodes 32, 33 corresponding to the pressing position, and is fed into the control device 28. The control device 28 detects the pressing position as the operating position of the transparent electrodes 39 to 42; 32, 33, that is, the input coordinates as the coordinates (x, y), (x=1 to 4, y=1) of the pressing region 49 of two lines and four rows as an example of matrix arrangement.

As the input of the first input unit 24, since the shape and arrangement density of the spacer 45 in the first input unit 24 are as mentioned above, input by a member relatively low in the pressing pressure such as finger 51 is prevented, and only the input by a hard object of small area such as pen piece 50 is enabled. The control device 28 scans the first input unit 24 as follows. Refer to FIG. 7 and FIG. 9 hereinafter. By turning on the switches S1, S2 and turning off the switches S3, S4, a voltage (V1–V2) is applied between the electrodes 30 and 31. At this time, the transparent electrode 29 has a voltage distribution, from potential V1 to potential V2 in a distance x0 between the electrodes 30 and 31.

At the next timing, the control device 28 cuts off the switches S1, S2, and turns on the switches S3, S4. As a result, a voltage (V3–V4) is applied between the electrodes 37 and 38, and the voltage distribution is from potential V3 to potential V4 in a distance y0 between the electrodes 37 and 38 in the transparent electrode 36. In the state of alternately repeating such scannings, the operator presses the pressing position P by the pen piece 50. While a voltage (V4–V2) is applied between the electrodes 30 and 31, the potential Vx at the pressing position P is determined in formula (2) depending on the distance x1, x2 from the electrodes 30, 31 of the pressing pressure P.

$$Vx = x2(V1-V2)/x0 \qquad (2)$$

This potential Vx is read in the control device 28 through transparent electrodes 36, contacting with the transparent electrode 29 and electrodes 37, 38.

On the other hand, in the period while the switches S3, S4 are conducting when pressing, the potential Vy at the pressing position P is determined in formula (3) depending on the distances y1, y2 of the pressing position from the electrodes 37, 38.

$$Vy = y2(V3-V4)/y0 \qquad (3)$$

This potential Vy is read in the control device 28 through the transparent electrode 29 contacting with the transparent electrode 36, and electrodes 30, 31. When the control device 28 reads the potentials Vx, Vy, the coordinates (x1, y1) of the pressing position P can be obtained according to the following formula (4) and formula (5).

$$x1 = x0(1-Vx/(V1-V2)) \qquad (4)$$

$$y1 = y0(1-Vy/(V3-V4)) \qquad (5)$$

Thus, in this embodiment, by setting the first input unit 24 and second input unit 25 on a pair of transparent electrodes 22, 23, the first input unit 24 allows only the input by a member relatively high in pressing pressure such as a piece 50, and prevents input by member of relatively low pressing pressure such as the operator's finger of a man. Therefore, when the operator holds the pen piece 50 and makes an input in the first input unit 24, wrong input by the hand holding the pen piece 50 put on the first input unit 24 is prevented.

Second input unit 25 is provided adjacent, input unit 24 and is structured to allow input by a user's finger or the like.

Therefore, input by the pen piece 50 is also possible. In this embodiment, as mentioned above, the first input unit 24 and second input unit 25 are formed on panel member 26. Therefore, when plural members differing in the input operation state are required, the necessity of first input unit and second input unit having independent structures is eliminated, so that the construction may be reduced in size and simplified.

For connection of the first input unit 24, second input unit 25, and control device 28, in this embodiment connection terminals 35, 44 are assembled at one position predetermined in every transparent substrate, 22, 23, and therefore the connection structure is simplified as compared with that in which the first input unit 24 and second input unit 25 are each on an independent substrate.

Figure 13:
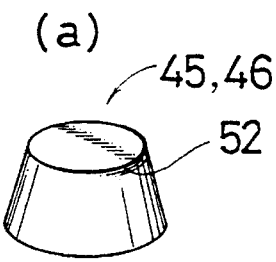
FIGS. 13 (a) and (b) is a perspective view of spacers 45, 46 of FIG. 10.
Figure 13:
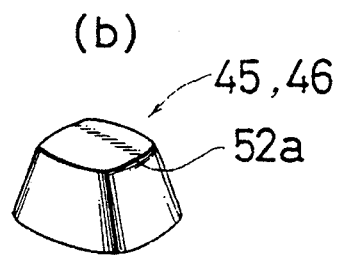

FIG. 13 is a perspective view of spacers 45, 46. FIG. 13 (a) shows the spacers 45, 46 in one embodiment which spacers are formed approximately in the shape of a truncated cone, while the peripheral edge 52 of the upper end face contacting with the transparent electrode 29 of the transparent substrate 22 is formed to have round corners so as not to damage the transparent electrode 29 due to contact. Modified examples of the spacers 45, 46 are shown in FIG. 13 (b) wherein the spacers are formed the shape of a truncated pyramid. In this case, too, each peripheral edge 52a of the upper end face of the spacers 45, 46 is also formed to have a round corner.

Figure 14:
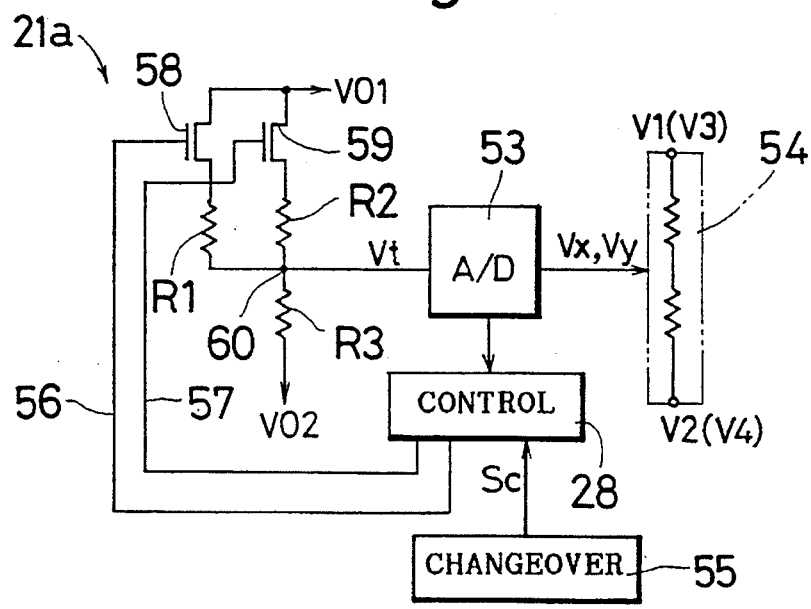
FIG. 14 is a block diagram of a coordinates input device 21a of a second embodiment of the invention.

Referring to FIG. 14 embodiment of the A coordinates input device 21a possesses the same input unit 24 of the panel member 26, display device 27, control device 28 and analog/digital converter 53 as explained by reference to FIGS. 5 to 10 in the foregoing embodiment, and corresponding parts are identified with same reference numbers, and the following explanation is made by reference to FIGS. 5 to 10. As mentioned herein, the coordinates input device 21a of this embodiment has the panel member 54 the same as panel member 26 in the foregoing embodiment, and has the same scanning of the first input unit 24 and the same reading process as explained in the foregoing embodiment.

More specifically, from the panel member 54, output voltages Vx, Vy of analog quantity are obtained, and fed into the analog/digital converter 53 to be converted into digital signals and are read by the control device 28. In this embodiment, changeover means 55, composed of a switch or the like, is connected to the control device 28 and a changeover signal Sc of high level or low level is fed to the control device 28.

That is, the panel member 54 in this embodiment is composed only of the first input unit 24 in the foregoing embodiment, and does not include an input unit corresponding to different input means, such as pen piece 50 and finger 51 (FIG. 5) by using the first input unit 24 and second input unit 25 as in the previous embodiment. In this embodiment, the panel member 54 (referring again to FIGS. 8 and 10) comprises a pair of transparent electrodes 22, 23 and transparent electrodes 29, 36, electrodes 30, 31; 37, 38, and the spacer between the transparent electrodes 22, 23 is set nearly at the same height and interval as the spacer 46 in the second input unit 25 in the preceding embodiment. As a result, the panel member 54 allows input also by pressing by a finger.

Figure 15:
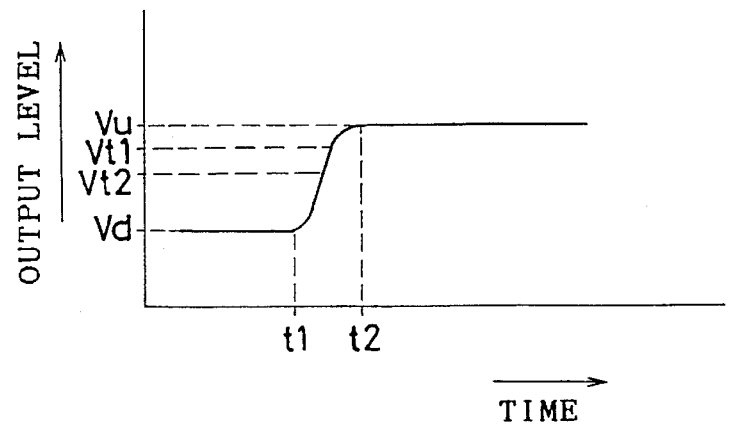
FIG. 15 is a graph showing the voltage output level versus the pressing force of transparent electrodes 29, 36.

Here, the transparent electrodes 29, 36 composed of ITO or the like disposed on the panel member 54 show changes of output level voltage as shown in FIG. 15 versus the pressing operation. In FIG. 15, the panel member 54 starts pressing at time t1, and the pressing force gradually increases to reach the maximum pressing force at time t2, and thereafter maintains, this level as it should. At this time, the ITO film gradually increases the output level as the pressing force increases as indicated by the curve between time t1 and t2. Therefore, between the minimum output level Vd and maximum output level Vu of the output signal, plural, thresholds Vt1, Vt2 are set, so that it is possible to change over whether or not to accept the output signal by a relatively weak pressing pressure as a coordinate input signal.

In the block diagram in FIG. 14, when the changeover signal Sc from the changeover means 55 is high, the high side reference signal Vt1 in FIG. 15 is selected, and when the changeover signal Sc is low level, the reference voltage Vt2 at the low side in FIG. 15 is selected as in the following explanation.

Signal lines 56, 57 connected to the control device 28 are respectively connected to the gates of transistors 58, 59, and the sources of the transistors 58, 59 are connected to a common supply voltage V01, and the drains of the transistors 58, 59 are connected to a common resistance R3 through resistances R1, R2, respectively. The other end of the resistance R3 is connected to a supply voltage V02 different from the supply voltage V01. The potential between the resistances R2, R3 is supplied to the analog/digital converter 53 as reference voltage VT. It is assumed here that the resistance R1 is lower in resistance value than the resistance R2.

The control device 28 supplies signals of high level and low level to signal lines 56, 57. As a result, the transistor 58 is made to conduct, while the transistor 59 is cut off. Therefore, from the connection point 60, the reference voltage Vt1 determined in formula (6) is sent into the analog/digital converter 53.

$$Vt1=R3(V01-V02)/(R1+R3) \tag{6}$$

On the other hand, when the control device 28 sends out signals of low level and high level to the signal lines 56, 57, the transistor 58 is cut off, while the transistor 59 is turned on. As a result, from the connection point 60, the reference voltage Vt2 shown in formula (7) is sent out to the analog/ digital converter 53.

$$Vt2=R3(V01-V02)/(R2+R3) \tag{7}$$

As mentioned above, the resistance value of the resistance R1 is set smaller than the resistance value of the resistance R2, and the reference voltage Vt1 is higher in level than the reference voltage Vt2.

In this way, reference voltages Vt1, Vt2 differing in the level are selectively fed into the analog/digital converter 53 by the changeover signal Sc from the changeover means 55, and the panel member 54 allows input only by the pressing operation by a member relatively high in pressing pressure such as pen piece 50, thereby changing over the operating state for not realizing the input by pressing by a member relatively low in pressing pressure such as a finger.

In this embodiment, in other words, the same effects as in the foregoing embodiment are achieved, and in addition, by using a single input unit similar to the first input unit 24 in the first embodiment, the input state equivalent to the input by the first input unit 24 and second input unit 25 in the foregoing embodiment is realized, and the is further simplified, while the utility is enhanced.

Next, a third embodiment of the invention is described in detail below with reference to embodiment is shown FIG. 16 and FIG. 17.

The input and output device comprises a CPU (central processing unit) 71 for managing and controlling the device centrally, ROM 72 and RAM 73 for storing program and data, a clock 74, an I/O (input/output) unit 75 including printer and CRT (cathode-ray tube) connected to the device, a keyboard 76 for entering data to the device from outside, a display unit 77 including a display such as a liquid crystal display and etc., a display drive circuit 78 for driving the display unit 77 controlled by the CPU 71, an A/D converter (analog/digital converter) 79, a tablet unit 80, and a tablet control let 81 for driving and controlling the tablet unit 80 depending on the control by the CPU 71.

Figure 16:
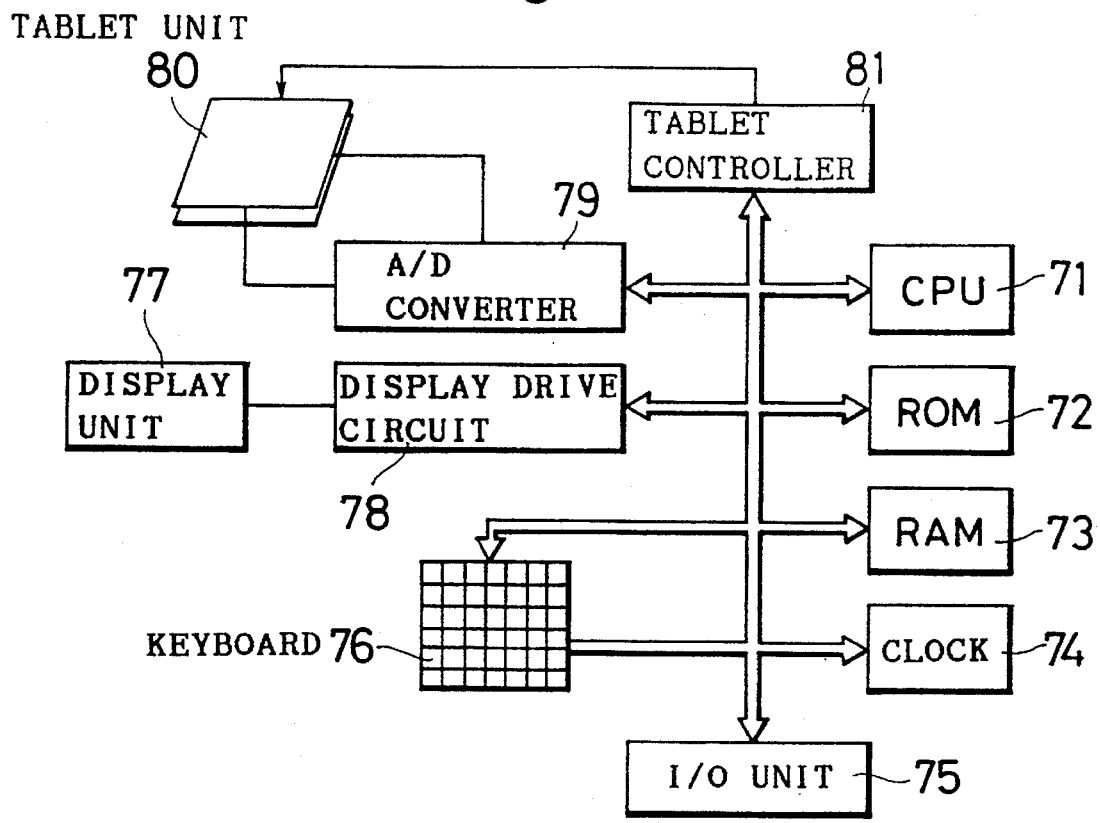
FIG. 16 is a block diagram of an input and output device applied in a third embodiment of the invention and in the prior art.
Figure 17:
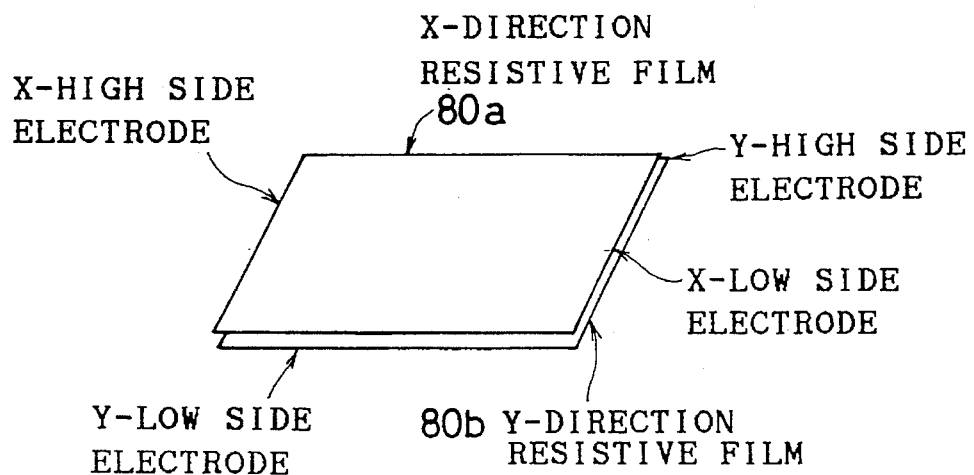
FIG. 17 is a structural diagram of the tablet unit shown in FIG. 16.

FIG. 17 shows in more detail tablet unit 80 shown in FIG. 16. The tablet unit 80 is composed by combining an X-direction resistive film 80a which is a resistive thin film having electrodes disposed at both ends of the horizontal direction in the drawing (that is, the X-direction), and a Y-direction resistive film 80b which is a resistive thin film having electrodes disposed at both ends of the vertical direction of the drawing (that is, the Y-direction), across a uniform tiny clearance. In the X-direction resistive film 80a, when a voltage is applied from the tablet controller 81, electricity flows from the X-HIGH side electrode to the X-LOW side electrode. In the Y-direction resistive film 80b, when a voltage is applied from the tablet controller 81, electricity flows from the Y-HIGH side electrode to the X-LOW side electrode.

In operation, the user presses an arbitrary position on the principal surface of the tablet unit 80 by the tip of pen or pencil, and the resistive films 80a and 80b contact with each other at the pressing position. This pressing force is detected as an electric signal, and when this detection level reaches a specified level, the division resistance value on the resistive films 80a and 80b, that is, the pressing position is detected as a voltage level. This voltage signal is individually led out by the X-direction resistive film 80a and Y-direction resistive film 80b, and is input to the CPU 71 as XY coordinate values through the A/D converter 79. The CPU 71 drives the display drive circuit 78 depending on the given coordinate values, and the circuit 78 displays and drives the corresponding liquid crystal picture element on the display unit 77. Therefore, when the user presses a desired position on the tablet unit 80, the picture element of the display unit 77 corresponding to the pressing position is displayed and driven.

Figure 18:
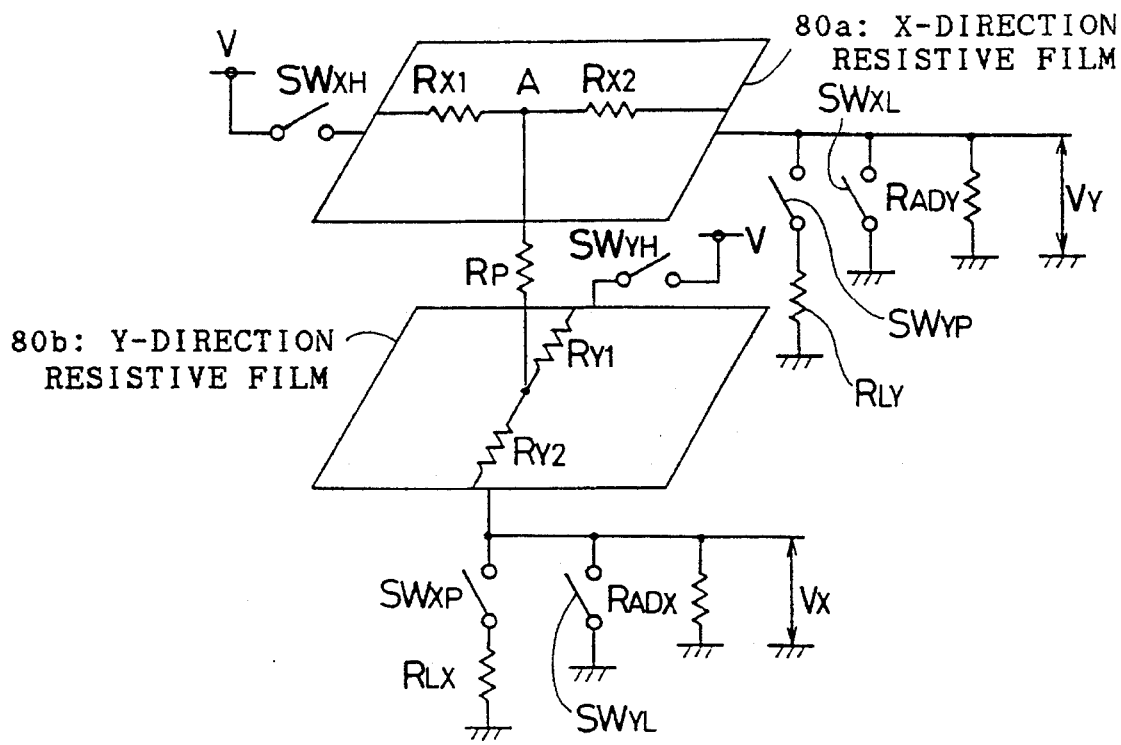
FIG. 18 is a schematic structural diagram of a driving circuit and measuring circuit of a tablet unit of an input and output device in the third embodiment of the invention.

FIG. 18 is a schematic structural diagram of drive circuit and measuring circuit of tablet unit of an input and output device in the third embodiment of the invention.

Figure 19:
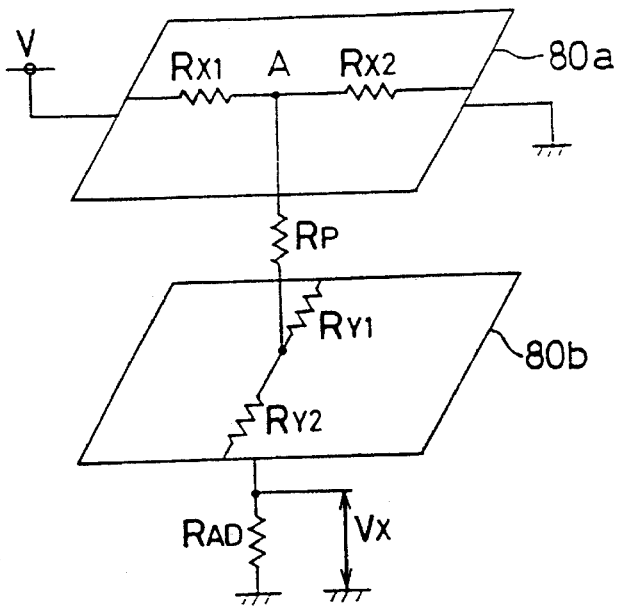
FIGS. 19 (a) and 19 (b) are diagrams for explaining the principle of measurement of coordinates of an input and output device in the third embodiment of the invention.
Figure 19:
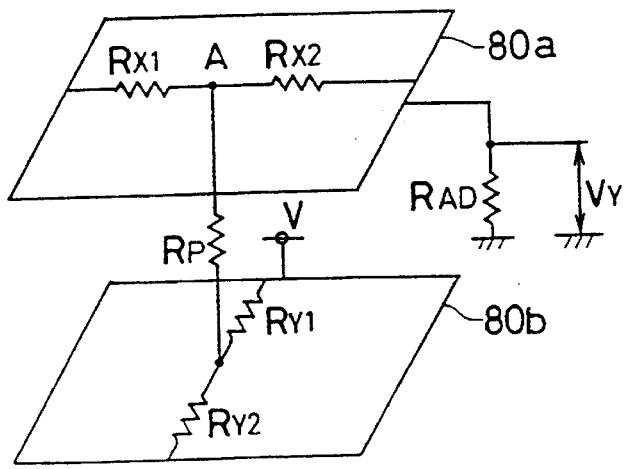

FIGS. 19 (a) and (b) are diagrams for explaining the principle of measurement of coordinates of input and output device in the third embodiment of the invention.

Figure 20:
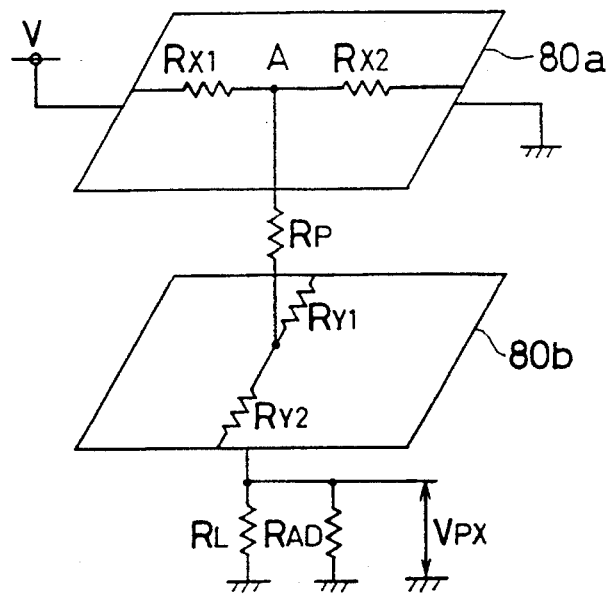
FIGS. 20 (a) and 20 (b) are diagrams for explaining the principle of measurement of pressing level of an input and output device in the third embodiment of the invention.
Figure 20:
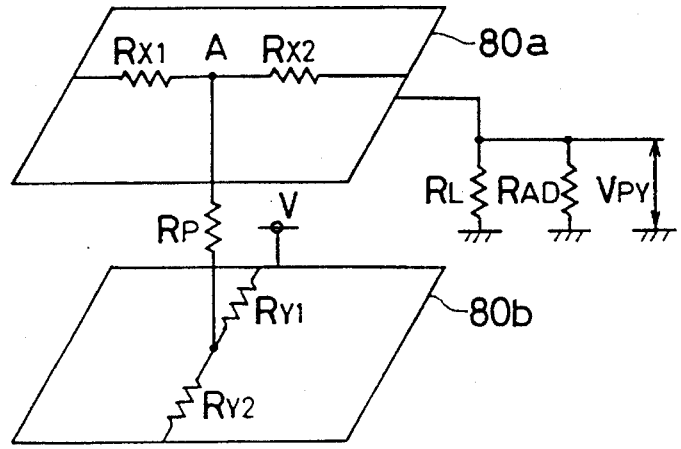

FIGS. 20 (a) and (b) are diagrams for explaining the principle of measurement of pressing of the input and output device in the third embodiment of the invention.

Figure 21:
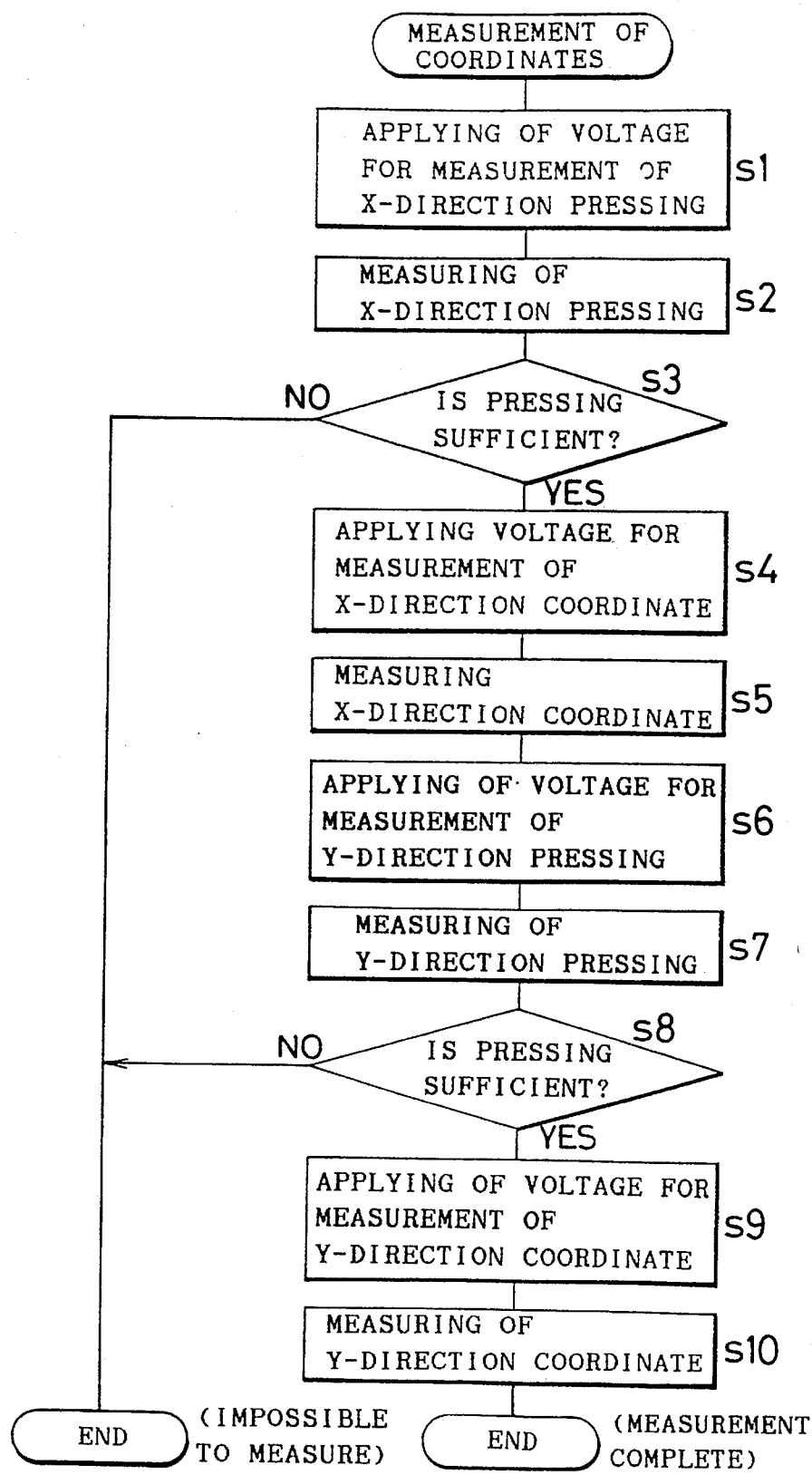
FIG. 21 is a process flow chart for measurement of coordinates of an input and output device in the third embodiment of the invention.

FIG. 21 is a processing flow chart for measurement of coordinates of input and output device in third embodiment of the invention.

As shown in FIG. 17, the structure of the tablet unit 80 of the input and output device in the embodiment has the resistive film 80a having electrodes at both ends in the X-direction and the resistive film 80b having electrodes at both ends in the Y-direction completely overlapped with each other across a tiny clearance. The switches included in the tablet controller 81 for controlling the tablet unit 80 are composed of switching elements such as transistors. The measured voltage of the tablet unit 80 is read out by the A/D converter 79, converted into a digital signal, and is input to the CPU 71.

The connection state of circuits in measurement of coordinates of the tablet unit 80 in this embodiment is described below while referring to FIG. 19.

The coordinates of the pressing position on the tablet unit 80 are measured in the X-direction and Y-direction, individually in each direction, that is, the coordinates are measured twice.

First, as shown in FIG. 19 (a), the circuits are connected. Suppose point A is pressed. The contact resistance $R_P$ is the contact resistance between the resistive films 80a and 80b when Point A is Dressed, and the input resistance $R_{AD}$ of the A/D converter is in the relation of $R_{AD} \gg R_P, R_{X1}, R_{X2}, R_{Y1}, R_{Y2}$. The division resistances $RX_1, R_{X2}$ in the X-direction are division resistance values on the resistive film 80a at the pressing position A, and the division resistances $RY_1, R_{Y2}$ in the Y-direction are division resistance values on the resistive film 80b at the pressing position A.

At the pressing position A, the measured voltage $V_X$ of the X-direction coordinate is $$V_X = V \cdot R_{X1}/(R_{X1}+R_{X2}) \qquad (8)$$

($R_{AD}$ is supposed to be much larger than the other resistances). and the voltage level $V_X$ is proportional to the pressing position A in the X-direction. Therefore, by measuring the voltage $V_X$, the division resistance $R_{X2}$ at the pressing position A, that is, the X-coordinate is obtained.

Next, when the circuits are connected as shown in FIG. 19 (b), the measured voltage Vy of the Y-direction coordinate is similarly $$V_Y = V \cdot R_{Y2}/(R_{Y1}+R_{Y2}) \qquad (9)$$

and the division resistance $R_{Y2}$ at the pressing position A, that is, the Y-coordinate is determined.

In this way, the coordinates of the pressing position A on the tablet unit 80 are determined in terms of the measured voltages $V_X$ and $V_Y$ depending on the division resistances $R_{X2}$ and $R_{Y2}$.

The principle of measurement of pressing level in the tablet unit 80 in the embodiment is explained by reference to FIGS. 20 (a) and 20 (b).

FIGS. 20 (a) and 20 (b) the connection state of circuits for measurement of pressing level.

To measure the pressing level in the X-direction, in the first place, the circuits are connected as shown in FIG. 20 (a). The resistance $R_L$ for pressing measurement possesses the relation of $R_L \ll R_{AD}$. At the pressing position A, the pressing measurement voltage $V_{PX}$ is $$V_{PX} = V \cdot R_L/(R_{X1}+R_P+R_{Y2}+R_L) \qquad (10)$$

Hence supposing, $R_P \gg R_{X1}, R_{Y2}$, the pressing level measured voltage $V_{PX}$ is a value inversely proportional to the contact resistance $R_P$, and hence the contact resistance $R_P$ may be measured from the pressing level measured voltage $V_{PX}$.

Next, the pressing level measured voltage $V_{PY}$ in the Y-direction is obtained by connecting the circuits as shown in FIG. 20 (b). In this case, the pressing level measured voltage $V_{PY}$ is $$V_{PY} = V \cdot R_L/(R_{X2}+R_P+R_{Y1}+R_L) \qquad (11)$$

and the contact resistance $R_P$ is measured from the pressing level measured voltage $V_{PY}$.

Thus, when the pressing position A is pressed, it is shown whether the magnitude of the X-direction pressing level measured voltage $V_{PX}$ and Y-direction pressing level measured voltage $V_{PY}$ (both inversely proportional to the contact resistance $R_P$), has reached the coordinates measurable level or not.

Referring then to the driving circuit and measuring circuit of the tablet unit 80 in FIG. 18, the coordinates measuring operation is explained below in accordance with the processing flow in FIG. 21.

The CPU 71 repeatedly executes the coordinates measuring action in FIG. 21, in response to the periodic interruption of the built-in timer.

In the processing at step S1 in FIG. 21 (abbreviated as S1 in the diagram), the CPU 71 applies a voltage for measuring the X-direction pressing level. The CPU 71 sets the switches $SW_{XH}$ and $SW_{XP}$ in FIG. 18 in ON state through the tablet controller 81, and sets all other switches in OFF state, and hence applies a voltage for measuring the X-direction pressing level to the tablet unit 80, and the CPU 71 waits until this applied voltage is stabilized.

In the processing at the next step S2, the CPU 71 measures the X-direction pressing level. Suppose the pressing position A is pressed. At this time, the X-direction pressing level is determined from the measured voltage $V_X$ by applying the formula (10). That is, the magnitude of the contact resistance $R_P$ at this time is obtained.

Successively, in the processing at step S3, it is judged whether the pressing is sufficient or not on the basis of the X-direction pressing level (contact resistance $R_P$) obtained in the processing at the preceding step S2. That is, the measured voltage $V_X$ is compared with a specific voltage level, and it is judged whether the X-direction pressing level is sufficient or not depending on the result of comparison. At this time, if the pressing is insufficient and the measurement of coordinates at high precision is judged to be impossible, the processing for a series of coordinates measurement is terminated. To the contrary, when the pressing level is sufficient and it is judged the pressing level is enough for enabling measurement of coordinates at high precision, the processing at step S4 is executed.

In the processing at the next step S4, the CPU 71 applies a voltage for measuring the X-direction coordinate. That is, by setting the switches $SW_{XH}$ and $SW_{XL}$ in the ON state through the tablet controller 81, and setting all the other switches in the OFF state, a voltage for measurement of the X-direction coordinate is applied to the tablet unit 80. The CPU 71 waits until this applied voltage reaches a stable level.

In the processing at the next step S5, the X-direction coordinate is measured. That is, the measured voltage $V_X$ obtained by applying the formula (8) is read out by the A/D converter 79, and it is converted into a digital signal, and is read out as the X-coordinate signal by the CPU 71.

In the processing at the next step S6, the CPU 71 applies a voltage for measurement of the Y-direction pressing through the tablet controller 81. That is, the tablet controller 81 sets the switches $SW_{YH}$ and $SW_{PY}$ in FIG. 18 in the ON state, and sets all the other switches in the OFF state. The CPU 71 waits until this applied voltage is stabilized.

In the processing at the next step S7, the CPU 71 measures the Y-direction pressing level. That is, the measured voltage $V_Y$ determined from the formula (11) is converted into a digital signal through the A/D converter 79, is led out into the CPU 71 and is measured.

The CPU 71, in the processing at the next step S8, compares the Y-direction pressing level, that is, the digital signal of the measured voltage $V_Y$ and the digital signal level corresponding to the specified voltage level, and judges whether the pressing in the Y-direction at the pressing position A is sufficient or not, that is, whether the contact resistance $R_P$ is low enough for measuring the coordinates or not. At this time, if the pressing level is judged to be insufficient, the series of processing for coordinates measurement is terminated. To the contrary, when the pressing level at the pressing position A is sufficient, the processing after step S9 is executed.

The CPU 71, in the processing at the next step S9, sets the switches $SW_{YL}$ and $SW_{YH}$ in FIG. 18 in ON state, and sets all other switches in OFF state by controlling the controller 81. As a result, a voltage for measurement of the Y-direction coordinate is applied. The CPU 71 waits until this voltage is stabilized.

In the processing at the next step S10, the CPU 71 measures the coordinates in the Y-direction. That is, the A/D converter 79 reads the measured voltage $V_Y$ led out from the formula (9), converts at into a digital signal, and inputs the signal to the CPU 71 to obtain the coordinates. Afterwards, the CPU 71 sets all switches in the OFF state as shown in FIG. 18 through the tablet controller 81, and acts to lower the consumption of current in the device.

In the above procedure, the pressing levels in the X-direction and the Y-direction are measured, and only when the measured pressing levels are sufficient are coordinates at the pressing position A in the X-direction and Y-direction output. Thus, in this embodiment, since the pressing level is measured in two directions, the X-direction and the Y-direction, the precision of the measurement of pressing level is enhanced. This point is described in further detail below.

The measured value of the pressing level in the X-direction in the tablet unit 80 is $$V_{PX} = V \cdot R_L / (R_{X1} + R_P + R_{Y2} + R_L) \qquad (10)$$

as mentioned above from FIG. 20 (a), and the contact resistance $R_P$ is a value depending on the pressing level to be determined, while the resistance $R_L$ for pressing measurement is a fixed value. The division resistances $R_{X1}$ and $R_{Y2}$ are resistance values which varying depending on the pressing position A on the plane of the tablet unit 80. Therefore, when pressed with the same pressure, the maximum value and minimum value of the pressing measurements at the position on the tablet unit 80 are as follows.

$$\text{Maximum: } V_{PXMAX} = V \cdot R_L / (R_{X1MIN} + R_P + R_{Y2MIN} + R_L) \qquad (12)$$

$$\text{Minimum: } V_{PXMIN} = V \cdot R_L / (R_{X1MAX} + R_P + R_{Y2MAX} + R_L) \qquad (13)$$

The maximum $V_{pxmax}$ is the value obtained when the lower left corner is pressed in FIG. 20 (a), and the minimum $V_{PXMIN}$ is the value obtained when the upper right corner is pressed.

$R_{X1MAX} - R_{X1MINN}$ is the full resistance value of the resistive film in the X-direction, and the $R_{Y2MAX} - R_{Y2MIN}$ is the full resistance value of the resistive film in the Y-direction.

These full resistance values tend to increase due to the trend of increasing of size and saving of current consumption of the tablet unit 80, and the relation is not always $R_{X1}$, $R_{Y2} \ll R_P$, or $R_{X2}$, $R_{Y1} \ll R_P$, in either case of which the effect can no longer be ignored. In the prior art, since the pressing level was measured only in one direction, such effect directly appeared in the measured pressing level.

In this embodiment, as mentioned above, applying also the circuit of FIG. 20 (b), the pressing level is also measured in the Y-direction, in addition to the conventional X-direction. At this time, the measured value of the Y-direction pressing level is $$V_{PY} = V \cdot R_L / (R_{X2} + R_P + R_{Y1} + R_L) \qquad (11)$$

and the maximum and minimum values are $$\text{Maximum: } V_{PYMAX} = V \cdot R_L / (R_{X2MIN} + R_P + R_{Y1MIN} + R_L) \qquad (14)$$

Minimum: $V_{PYMIN}=V \cdot R_L/(R_{X2MAX}+R_P+R_{Y1MAX}+R_L)$  (15)

In FIG. 20 (b), the maximum $V_{PYMAX}$ corresponds to the upper right corner, and the minimum $V_{PYMAX}$, to the lower left corner.

As known from these results, it is known that the error of the pressing level measured value by pressing position is opposite in the X-direction and Y-direction. That is, for example, when the lower left corner is pressed, the X-direction pressing level is the maximum $V_{PYMAX}$, and the Y-direction level is the minimum $V_{PYMAX}$, and the maximum and minimum are inverse, and it is known that the present errors are mutually canceled in the X-direction and Y-direction. The dependence of the pressing level measurement on the pressing position may be suppressed to the difference of the middle part and corner of the tablet 80 (in other words, the effect may be suppressed within $\pm(\frac{1}{2})$ α of the resistance value of the resistive film).

As known from these results, the measuring precision of the pressing level is improved, and the threshold level used in the judgment whether a position has been intentionally pressed or not can be set more finely, so that the measuring precision of the coordinates may be enhanced.

Furthermore, according to the embodiment, the processing speed of the measurement of coordinates is increased. This point is described below.

Figure 1:
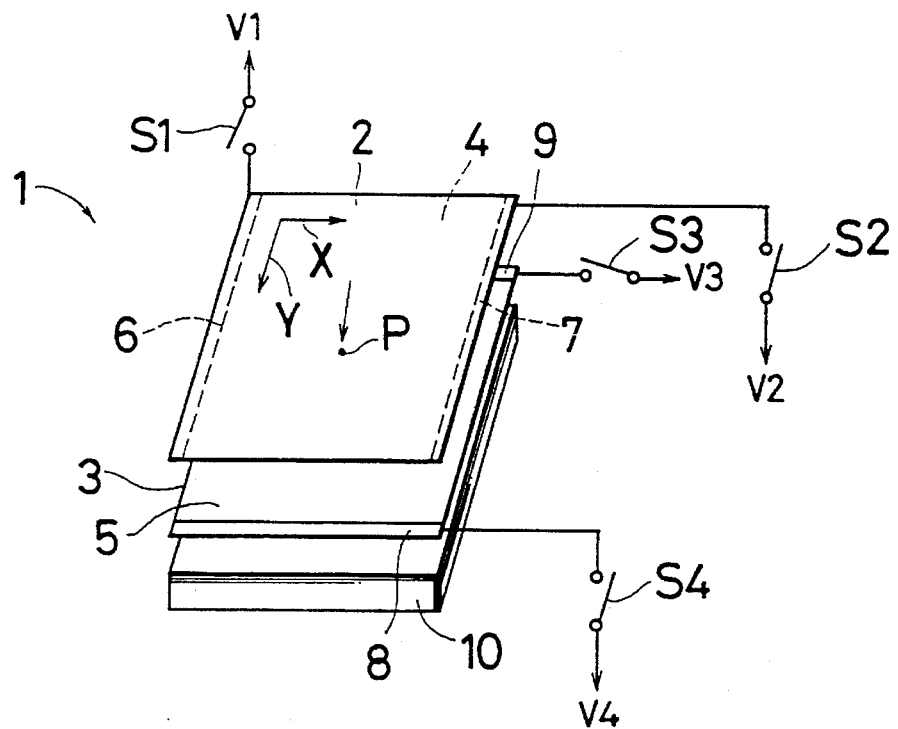
FIG. 1 is a perspective exploded view of a first prior art coordinate input device.
Figure 2:
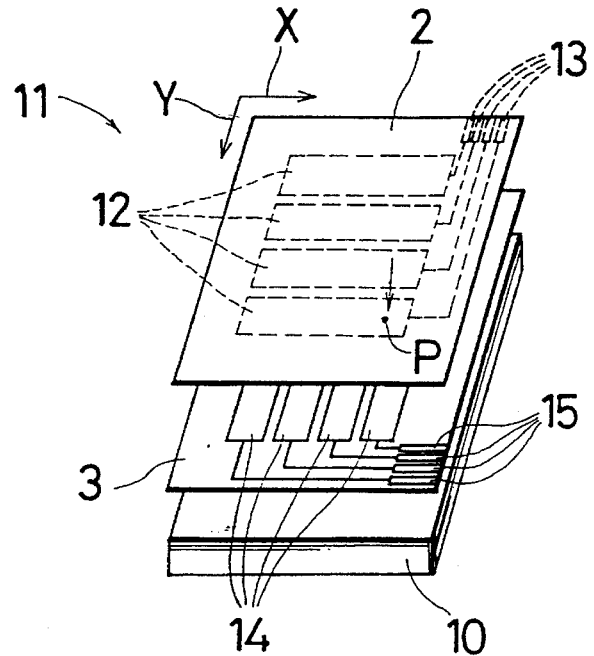
FIG. 2 is a perspective exploded view of a second prior art coordinate input device.
Figure 3:
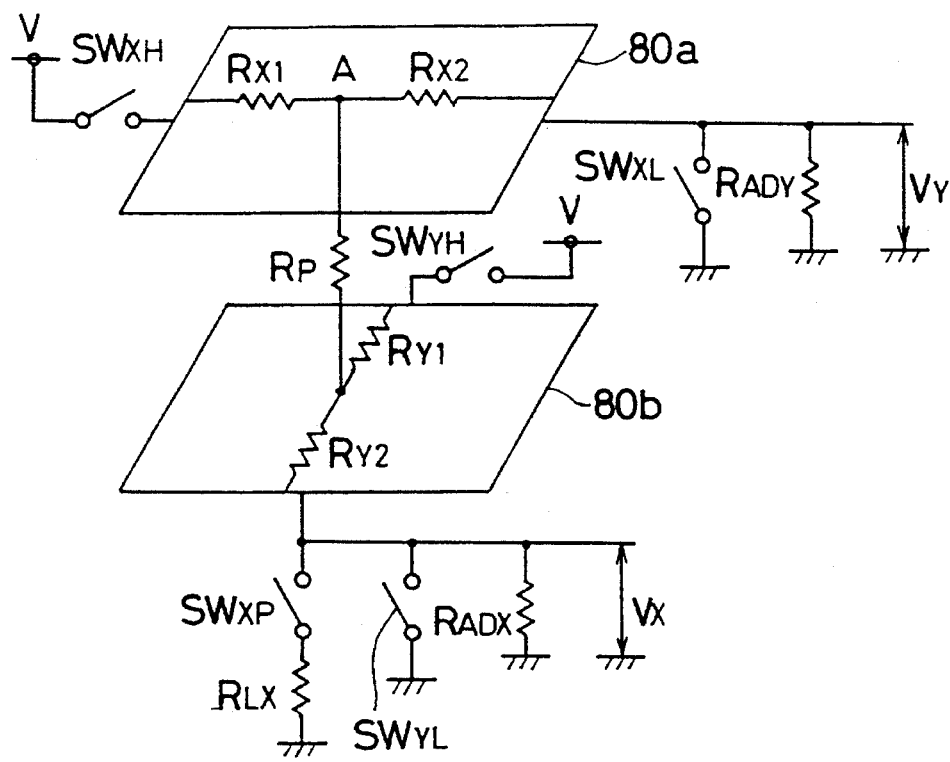
FIG. 3 is a diagram for explaining the operation of a conventional circuit for input of coordinates.
Figure 4:
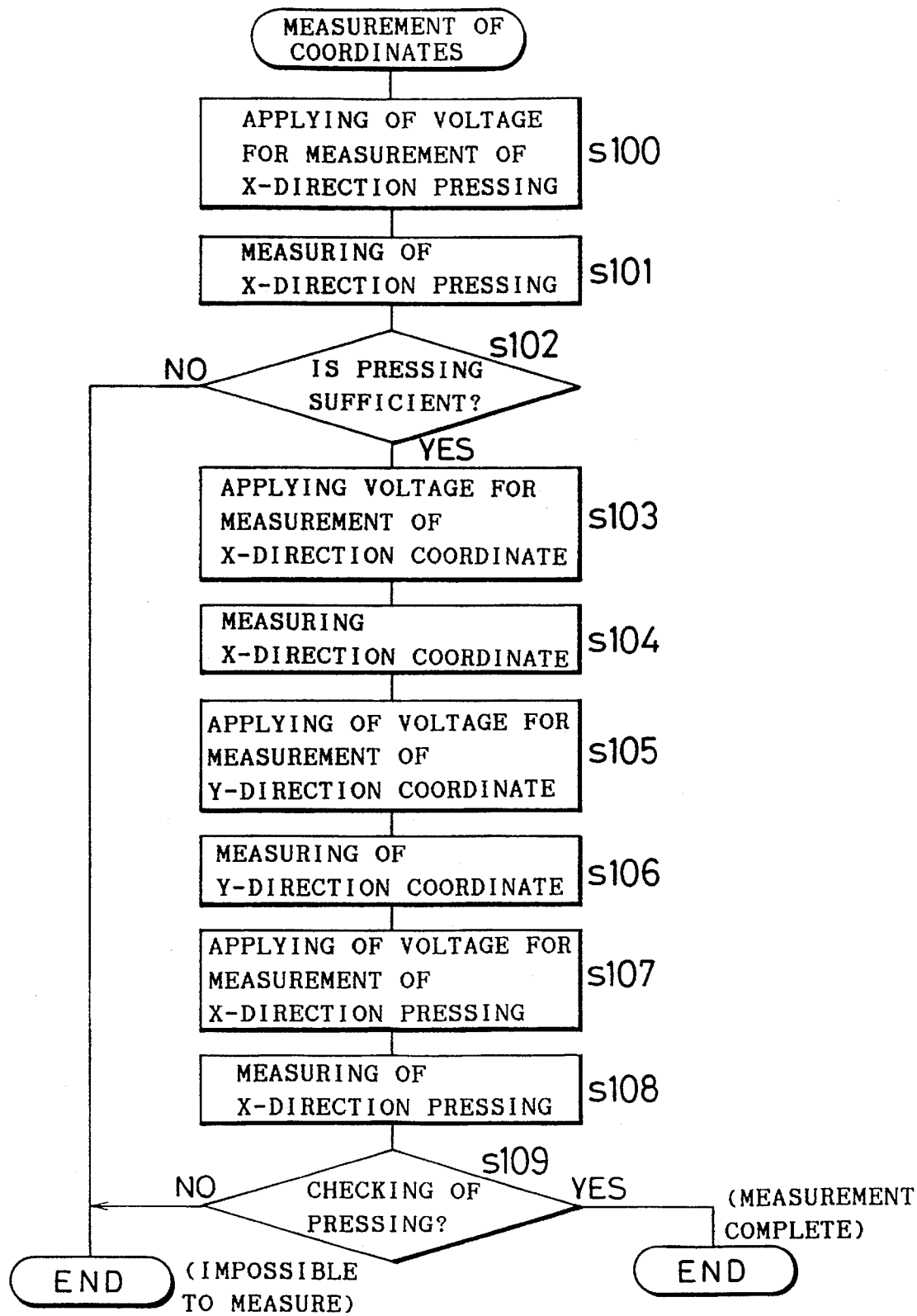
FIG. 4 is a processing flow chart for measurement of coordinates in a conventional input and output device.

The coordinates reading sequence of the conventional tablet 80 is, as shown in the processing flow in FIG. 4, as follows.

(a-1) Measurement of pressing (X-direction)
(a-2) Measurement of X-coordinate
(a-3) Measurement of Y-coordinate
(a-4) Measurement of pressing (X-direction)

In this sequence, considering the procedure of application of voltage to the tablet 80, when changing from step (a-2) to steps (a-3), or when changing from steps (a-3) to steps (a-4), the tablet controller 81 applies voltages in completely different directions to the tablet unit 80, and it is necessary to wait for a long time until the applied voltage reaches a stable level after voltage application (between (a-1) and (a-2), since the change of applied voltage is small, the waiting time is minimum).

By contrast, in the case of the present embodiment, as shown in processing flow in FIG. 21, the sequence of steps is as follows.

(b-1) Measurement of X-direction pressing level
(b-2) Measurement of X-coordinate
(b-3) Measurement of Y-direction pressing level
(b-4) Measurement of Y-coordinate Therefore, only when changing from steps (b-2) to steps (b-3) is the voltage applied in different directions, and a long waiting time thus needed. The other steps, only a minimum waiting time is needed. Accordingly, as compared with the prior art, the waiting time of the CPU 71 for measurement of coordinates is short, and the processing speed is enhanced on the whole.

Also, since in this embodiment after the time difference between the pressing level measurement and the coordinate measurement is shorter, if the user momentarily releases the tip of the pen on the principal surface of the tablet unit 80, the possibility of detecting the release of the pen is higher, and an inaccurate measurement of coordinates may be suppressed. In the prior art, since the time interval between the Y-coordinate measurement and the pressing level measurement is long, the precision of measurement of coordinates is enhanced in this embodiment as compared with the prior art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A coordinates input device comprising:

a first input unit, at a lower portion a panel member, having a transparent resistance layer formed on the entire inner surface of predetermined first regions of each of a pair of opposed electric insulating transparent substrates, and an electrode formed at each of two opposite ends of each transparent resistance layer such that each pair of electrodes extend in mutually crossing directions; and a second input unit, at an upper portion of said panel member, forming plural band-shaped transparent electrodes extending in mutually crossing directions, in second regions different from the first regions of the transparent substrates;

means to discriminate between input from the first input unit versus input from the second input unit without disabling input from either unit;

wherein bumps are disposed at predetermined intervals at least on one transparent substrate inner surface of the first input unit, and bumps are disposed on at least one transparent substrate inner surface of the second input unit at intervals greater than the intervals in the first input unit.

2. A coordinates input device as claimed in claim 1 wherein: the bumps are formed approximately in a truncated cone, and the peripheral edge of the upper end contacting with the transparent resistance layer or transparent electrode formed on the confronting substrate is rounded.

3. A coordinates input device as claimed in claim 1 wherein: the bumps are formed approximately in a truncated pyramid, and the peripheral edge of the upper end contacting with the transparent resistance layer or transparent electrode formed on the confronting substrate is formed rounded.

4. A coordinates input device as claimed in claim 1 wherein: the height of the bumps in the first input unit is selected larger than the height of the bumps in the second input unit.

5. A coordinates input device comprising: an input panel having a transparent resistance layer formed on mutually confronting inner surfaces of a pair of electric insulating transparent substrates, and an electrode formed at each of two opposite ends of each transparent resistive layer such that each pair of electrodes extend in mutually crossing directions, first means for converting an analog signal from the electrodes into a digital signal according to a first input threshold signal or a second input threshold signal which is different from said input signal, and threshold selecting means for selecting either the first input threshold signal or the second input threshold signal as the active threshold value in said means for converting an analog signal, said threshold selecting means including:

a control device for supplying signals of high level or low level to first and second signal lines, respectively, when said first input threshold is to be set, and for supplying signals of low level and high level to said first and second signal lines, respectively, when said second input threshold is to be set;

said first signal line connected to the base of a first transistor and said second signal line connected to the base of a second transistor, said first transistor connected between a common first supply voltage and a first resistor, and said second transistor connected between a common supply voltage and a second resistor;

said first resistor having a resistance lower than that of said second resistor, both said first and said second resistors connected to one end of a third resistor, which third resistor is connected at its other end to a common second supply voltage different than said first supply voltage;

an output of said threshold selecting means being connected to a node connecting said first resistor, said second resistor, and said third resistor.

6. A coordinates input device as claimed in claim 5 wherein said first and second input thresholds are set on the basis of the pressing force per unit area required to activate the input panel, and a first activation state of relatively large pressing pressure and a second activation state of relatively small pressing pressure are set.

7. A coordinates input device as claimed in claim 6 wherein: the level of the threshold signal in the first activation state is selected higher than the level of the threshold signal in the second activation state.

8. A coordinates input device comprising a conductive first sheet member to which a voltage is applied so as to form a voltage gradient in a first direction therein, and a conductive second sheet member to which a voltage is applied so as to form a voltage gradient in a second direction orthogonal to the first direction therein, and disposed so that said sheet members confront each other across a uniform specific interval such that the sheet members may contact each other at a pressed position and wherein the pressed position is read by a combination of electric signals and further including:

first means for applying said voltage so as to form a voltage gradient in the first direction, and for detecting the pressing level in the first sheet member as an electric signal, second means for applying said voltage so as to form a voltage gradient in the second direction, and for detecting the pressing level in the second sheet member as an electric signal, first reading means for reading the pressed position as an electric signal level of a voltage gradient in the first direction, responsive to the detection signal in the first means, and, second reading means for reading the pressed position as an electric signal of a voltage gradient in the second direction, responsive to the detection signal level of the second means.

9. A coordinates input device as claimed in claim 8 wherein: a voltage is applied to either said first or said second conductive sheet members, wherein the pressing level is detected and the pressing position is read, and wherein a voltage is then applied to the other conductive sheet member, the pressing level is detected and the pressing position is read.

10. A method of measurement of coordinates using a coordinate input device, said method comprising the following steps performed in the order listed:

(a) applying voltage to one side of a conductive first sheet member of a coordinate input device for measurement of the X-direction pressing level;

(b) measuring the X-direction pressing level and, if sufficient, proceeding with step (c); if not sufficient, ending the measurement;

(c) applying voltage to the side opposite said one side of a conductive first sheet member of said coordinate input device for measurement of the X-direction coordinate;

(d) measuring the X-direction coordinate;

(e) applying voltage to one side of a conductive second sheet member of said coordinate input device for measurement of the Y-direction pressing level;

(f) measurement of the Y-direction pressing level and, if sufficient, proceeding with step (g); if not sufficient, ending the measurement;

(g) applying voltage to one side, while grounding the opposite side of a conductive second sheet member of said coordinate input device for measurement of the Y-direction coordinate;

(h) measuring of the Y-direction coordinate.

* * * * *